A. R. EHLERS.
SAWMILL.
No. 78,443.                         Patented June 2, 1868.
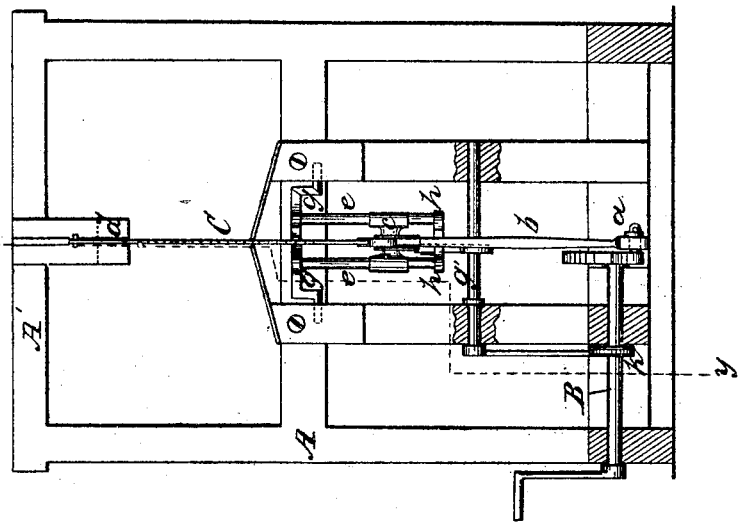
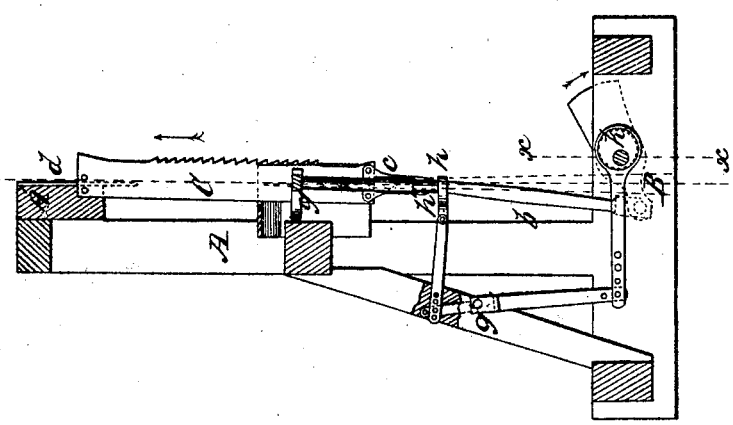
Witnesses
Thos Tusche
J. Alison Fraser
Inventor
A. R. Ehler
Per Munn & Co
Attorneys

United States Patent Office.

AUGUSTUS R. EHLERS, OF TANNERSVILLE, PENNSYLVANIA.

*Letters Patent No. 78,443, dated June 2, 1868.*

IMPROVEMENT IN SAW-MILLS.

*The Schedule referred to in these Letters Patent and making part of the same.*

TO ALL WHOM IT MAY CONCERN:

Be it known that I, AUGUSTUS R. EHLERS, of Tannersville, in the county of Monroe, and State of Pennsylvania, have invented a new and useful Improvement in Saw-Mill; and I do hereby declare that the following is a full, clear, and exact description thereof, which will enable others skilled in the art to make and use the same, reference being had to the accompanying drawings, forming part of this specification.

Figure 1 is a vertical section through the framing of a mill, presenting a side view of the saw and its driving-machinery.

Figure 2 is a front or edge view of the saw and its driving-machinery.

Similar letters of reference indicate corresponding parts.

This invention relates to an improvement in the construction of machinery for driving a straight saw for sawing lumber, and consists in hanging the saw, in connection with an oscillating-guide and slide, in such a manner that the saw shall advance and increase the bite of the teeth on the down stroke, and recede and withdraw the teeth from the log on the up stroke, thereby working with much less power, less wear, greater steadiness, and more rapidly.

A represents the framing for supporting the saw and machinery of a mill. B is a driving-shaft, having a crank, $a$, connected by the pitman $b$ with an oscillating-slide, $c$, to which the saw C is attached at the lower end, while its upper end is held between the edges of two guide-plates, $d\ d$, secured to the cross-beam A'.

The oscillating-slide $c$ works upon oscillating-guide rods $e\ e$, the upper ends of which are fastened to a rock-shaft, $g$, and the lower ends to the forks $h\ h$ of a yoke, $h'$, connected with the rock-shaft $g'$, which receives its motion from an eccentric, $k$, on the driving-shaft B.

It will be seen that by this arrangement of machinery in connection with the saw, the lower end will be drawn back from the log to a maximum degree at the end of its down stroke, when the crank $a$ is on its lower centre, and thus the saw will allow the log to be moved up at that moment, and on its up stroke will rise clear of the kerf to the highest point, from which it will again advance in making the down stroke by a regular movement, thus striking the log gently at first, and increasing the bite to the end of the stroke, instead of striking the log with a full bite at the top of the stroke, in the usual way.

The advantages of this arrangement are important in sawing lumber rapidly and preserving the saw-teeth from wear, as before stated.

Having thus described my invention, what I claim as new, and desire to secure by Letters Patent, is—

The combination and arrangement of the oscillating-slide $c$, the oscillating-guide rods $e\ e$, the rock-shafts $g\ g'$, and the eccentric, $k$, on the driving-shaft B, for producing a forward and backward movement of the saw below its upper end, which moves in the same vertical plane, as herein shown and described.

AUGUSTUS R. EHLERS.

Witnesses:
 AMOS S. BISLING,
 JACOB LEARN.